United States Patent [19]

Schlüter et al.

[11] Patent Number: 5,678,625
[45] Date of Patent: Oct. 21, 1997

[54] METHOD AND APPARATUS FOR A REGENERATIVE HEAT EXCHANGER FOR THE TREATMENT OF POLLUTANT-CONTAINING WASTE GASES

[75] Inventors: Siegfried Schlüter, Wenden-Rothemühle; Werner Niggeschmidt, Olpe, both of Germany

[73] Assignee: Apparatebau Rothemühle Brandt & Kritzler GmbH, Wenden, Germany

[21] Appl. No.: 184,459

[22] Filed: Jan. 21, 1994

[30] Foreign Application Priority Data

Jan. 23, 1993 [DE] Germany .................... 43 01 760.6

[51] Int. Cl.$^6$ .................................................. F23L 15/02
[52] U.S. Cl. .................... 165/7; 165/5; 422/173; 422/172
[58] Field of Search .................... 165/5, 7; 422/171, 422/172, 181; 110/203, 215, 345; 423/235, 239.1

[56] References Cited

U.S. PATENT DOCUMENTS

| | | | |
|---|---|---|---|
| 3,780,498 | 12/1973 | Wenner | 165/7 |
| 4,114,680 | 9/1978 | Kritzler et al. | 165/7 |
| 4,446,911 | 5/1984 | Reidick et al. | 165/7 |
| 4,602,673 | 7/1986 | Michelfelder et al. | 165/7 |
| 4,739,826 | 4/1988 | Michelfelder et al. | 165/133 |
| 5,145,652 | 9/1992 | Veser et al. | 422/172 |
| 5,176,088 | 1/1993 | Amrhein et al. | 110/345 |
| 5,237,939 | 8/1993 | Spokoyny et al. | 165/7 |
| 5,296,206 | 3/1994 | Chao et al. | 423/239.1 |
| 5,397,548 | 3/1995 | Kritzler et al. | 165/5 X |

FOREIGN PATENT DOCUMENTS

| | | |
|---|---|---|
| 0195075 | 5/1989 | European Pat. Off. . |
| 0257024 | 4/1991 | European Pat. Off. . |
| 0469593 | 2/1992 | European Pat. Off. . |
| 0502443 | 9/1992 | European Pat. Off. . |
| 9217267 | 10/1992 | WIPO . |

*Primary Examiner*—John Rivell
*Assistant Examiner*—Christopher Atkinson
*Attorney, Agent, or Firm*—Friedrich Kueffner

[57] ABSTRACT

A method for a regenerative heat exchanger for the treatment of pollutant-containing waste gases which are in a heat exchange with another medium. The heat exchanger includes stationary or rotating storage masses which are at least partially of catalytic material and to which a reduction agent is supplied from the hot side thereof. A penetration of the reduction agent into the flue gas flow can be prevented by supplying the reduction agent directly to the catalyst separately from the pollutant-containing waste gases and without coming into contact with the remaining heating surfaces. For this purpose, a nozzle arrangement having at least one arm and extending over the entire radius of the heat exchanger may be arranged in both hood sides of the heat exchanger.

8 Claims, 3 Drawing Sheets

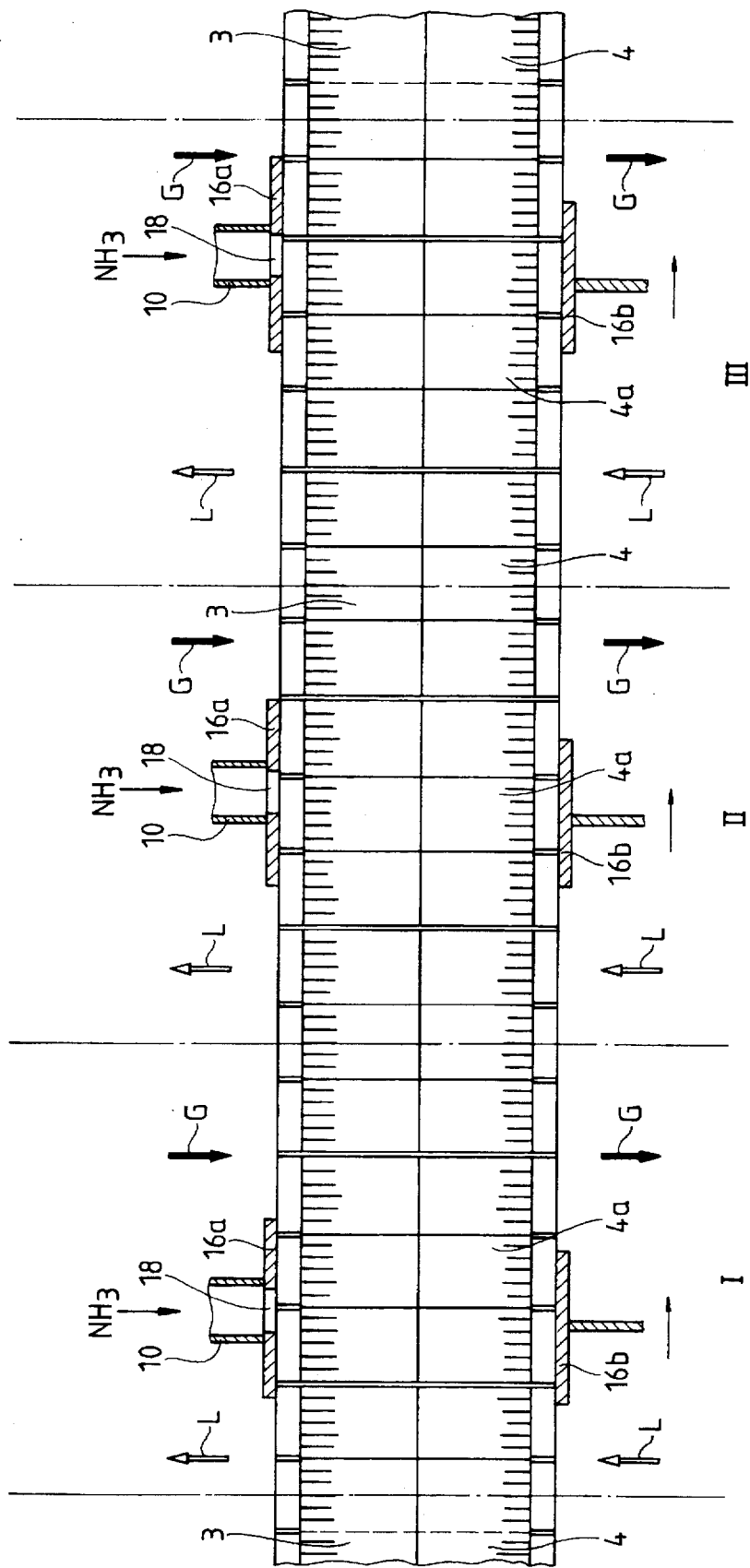

METHOD AND APPARATUS FOR A REGENERATIVE HEAT EXCHANGER FOR THE TREATMENT OF POLLUTANT-CONTAINING WASTE GASES

BACKGROUND OF THE INVENTION

1. Field of the Invention

The present invention relates to a method and an apparatus for a regenerative heat exchanger for the treatment of pollutant-containing waste gases which are in a heat exchange with another medium. The apparatus includes stationary or rotating storage masses which are composed at least partially of catalytic material and to which is supplied a reducing agent from the hot side thereof. The regenerative heat exchanger can be used for air preheaters as well as for gas preheaters.

2. Description of the Related Art

In power plant furnaces and industrial furnaces, the waste gases are utilized in a regenerative heat exchanger for preheating the combustion air. In this process, the nitrogen oxides NOx contained in the waste gas can be substantially reduced by constructing, in this case, the storage masses of the regenerative air preheater, which may be stationary or rotating, so as to act entirely or partially catalytically and by adding, for example, primarily ammonia as the reducing agent. Thus, the method involves the catalytic nitrogen oxide reduction, wherein the reduction or deoxidation of the nitrogen oxides takes place by adding the NH3 in the presence of a catalyst integrated in a regenerative air preheater or regenerative heat exchanger. As a rule, NOx containing waste gas is the flue gas of a furnace which flows through the regenerative heat exchanger at the end of a steam producer for preheating the combustion air.

For the purpose of selectively reducing nitrogen oxides in the waste gases of furnaces, it is already known in the art to introduce the NH3 into the waste gases emerging from the furnace either in the form of vapor, as a mixture with air as the carrier gas under pressure, or dissolved in water without pressure. By providing mixing stages with appropriate insulations within the downstream waste gas ducts, it is attempted to maintain a streak-free ammonia distribution and temperature distribution in the waste gas flow until it reaches the catalyst. Taking into consideration the optimum reaction temperatures, the catalyst or the storage masses are arranged within the waste gas flow in front of the rotating regenerative heat exchanger for transferring the waste gas heat to the combustion air to be supplied to the furnace. Particularly useful have been found to be catalysts in the form of fixed bed catalysts with vertically downwardly directed waste gas flow, wherein the waste gases from which the nitrogen is to be removed are alternatingly conducted to a plurality of such catalysts. The fixed bed catalysts have a web-like configuration and contain vanadium compounds as the catalytically acting materials which facilitate the transformation of the nitrogen oxides with the NH3 which has previously been introduced into the waste gas flow and are mixed in with fine distribution into the waste gas flow on the way to the catalyst. The reaction with the nitrogen oxides contained in the waste gases essentially results in molecular nitrogen and water as the reaction products which can then be conducted harmlessly into the atmosphere.

European patents 0 195 075 and 0 257 024 disclose adding the reduction agent on the crude gas side, flue gas side or waste gas side, or on the pure gas side or air side, or also on the gas side as well as on the air side. Thus, the NH3 is mixed into the flue gas before it enters the catalyst or to the fresh air to be heated before it enters the catalyst or to both sides as a combination thereof. In any event, the material components, i.e., NOx, contained in the flue gas are catalytically converted into harmless components.

In the known heat exchangers, a leak occurs when the NH3 is added on the side of the air as well as on the side of the flue gas. Even though sealing members are provided, it cannot be prevented when the NH3 is added on the side of the air that a certain portion of the reduction agents reaches from the side of the pure gas to the side of the purified flue gas. Thus, this portion is lost and is conducted to the subsequent apparatus components. Finally, when the NH3 is supplied from the side of the air, i.e., from the cold air side of the heat exchanger, the heating surfaces which do not act catalytically and are located in the low temperature range are also affected. In this case, the NH3 in these heating surface zones can be transferred through compensation and/or absorption, for example, in the combustion air preheating means from the air side to the flue gas side. This may be accompanied by the undesirable problem of a substantial increase of the NH3 excess in the waste gas and simultaneously of the NH3 content of the flue dust carried along in the flue gas.

SUMMARY OF THE INVENTION

Therefore, it is the primary object of the present invention to provide a method and an apparatus of the above-described type in which the above-described disadvantages can be avoided and to obtain a maximum NOx reduction with a high percent reaction, on the one hand, and in such a way which essentially prevents the reduction agent to enter the flue gas flow and, thus, the environment, on the other hand.

In accordance with the present invention, the reduction agent is supplied to the catalyst separately from the pollutant-containing waste gas and directly without coming into contact with the remaining heating surfaces.

Accordingly, the present invention is based on the concept of conducting the reduction agents introduced from the hot side of the heat exchanger to the heating surfaces of the catalyst directly on the shortest possible path and to blow the reduction agents into the packs of storage masses only to the same extent as the heating surfaces of the catalyst extent into the depth thereof.

In accordance with a further development of the invention, the reduction agent is supplied to the catalyst in the flue gas or air flow through a free jet nozzle system. In the case of an air preheater, this means that the injection of reduction agent takes place in a free jet against the emerging air flow on the hot side of the storage masses equipped with the catalyst elements. In this connection, the term free jet describes the type of flow of the medium emerging from the nozzle which as a result of its kinetic energy is moved freely through the surrounding atmosphere, i.e., it flows without special ducts or other guiding insulations to the catalyst elements.

In accordance with a preferred alternative embodiment of the method of the present invention, the reduction agent is supplied to the catalyst with the sealing system separating the heat exchanging media during the changeover from air to flue gas or from pure gas to crude gas. In this case, contrary to the free jet method, the reduction agent flows to the catalyst in a separate duct, wherein advantageously the nozzle arrangement is constructed as a flow duct arranged in the radial sealing ledges.

When the reduction agent is supplied through a separate duct of the sealing system, the reduction agent can be added in the manner of a partial chamber rinsing system. In this system, the respective storage mass cell is released by the corresponding radial sealing ledge on the opposite cold side only to such an extent that the entering reduction agent partially rinses out the flue gas filling and penetrates to the end of the catalyst zone. After a transition phase during which the cell to which the reduction agent flows is completely closed off on the cold side thereof, the sealing ledge again releases a cross-sectional area, so that the entering air now rinses out in a counterflow the residual flue gas and the excess reduction agent. During this procedure, no discharged medium flows against the reduction agent in the catalyst and, moreover, a longer dwell time is achieved for the reduction agent supply of the catalyst.

For achieving the free jet injection, the present invention proposes to arrange in both hood sides a nozzle arrangement having at least one arm and extending over the entire radius of the heat exchanger. The nozzle arrangement can be constructed in such a way that the at least one arm is provided with a slot-type nozzle; on the other hand, it is also possible to equip the at least one arm with individual nozzles which are arranged distributed over the radius of the heat exchanger. The slot-type nozzle or the row of individual nozzles are arranged in such a way that specifically the same amount of reduction agent is supplied to each area of the catalyst surfaces.

In accordance with an advantageous feature, the angle of the nozzle arrangement is adjustable. In this case, the position of the nozzle arrangement can be adjusted within one hood side or also within both sides of the upper hood in accordance with the most advantageous temperature range for the reduction agent absorption.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 4 is a sectional view taken along sectional line IV—IV of FIG. 3 through the catalyst composed of catalytically acting upper storage masses and a lower heat storage means.

DETAILED DESCRIPTION OF THE PREFERRED EMBODIMENTS

Figure 1:
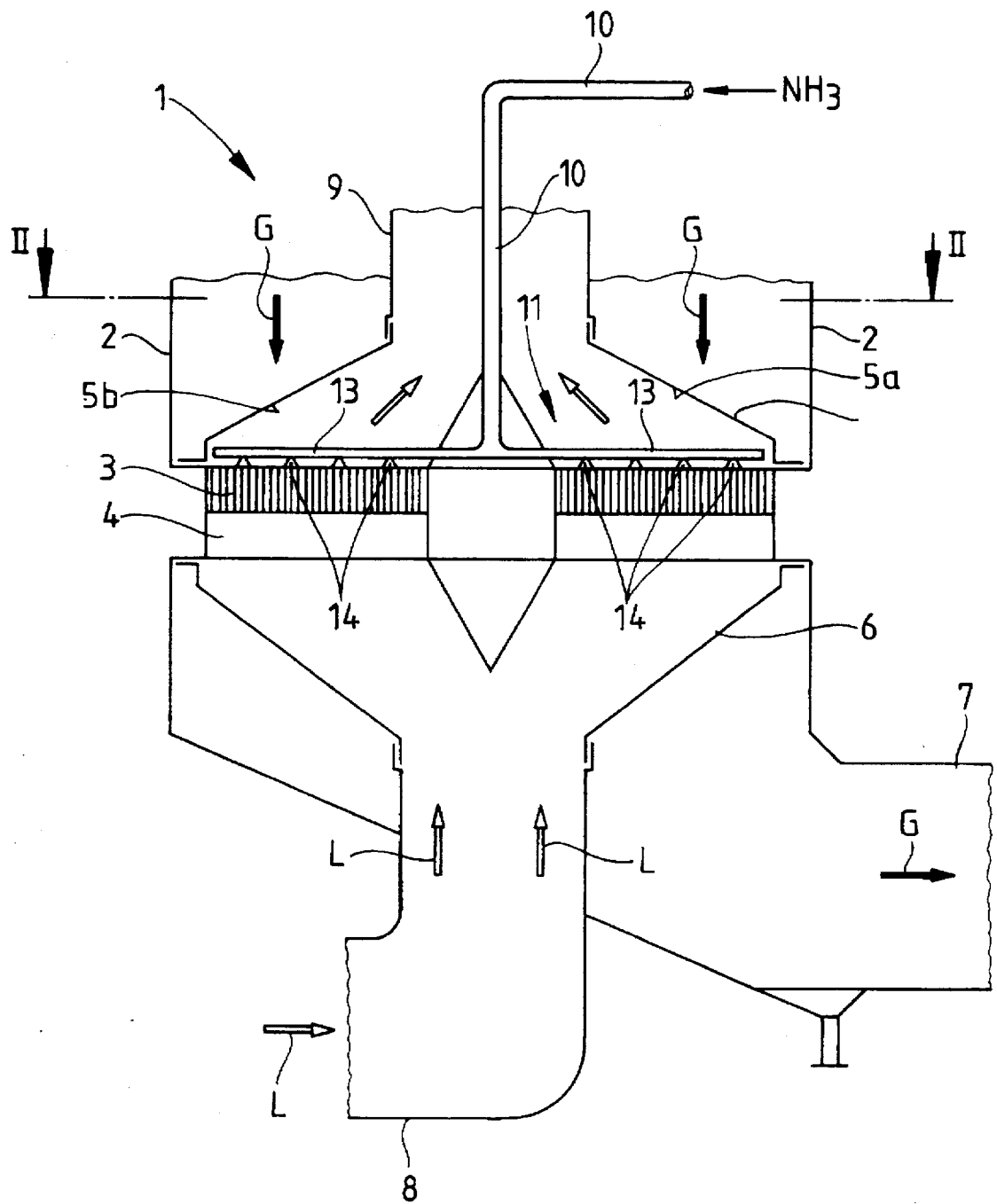
FIG. 1 is a schematic sectional view taken along sectional line I—I of FIG. 2 showing a regenerative heat exchanger according to the present invention with a reduction agent supply in the form a free jet nozzle arrangement arranged in front of the catalyst on the hot side thereof.

FIG. 1 of the drawing shows a regenerative heat exchanger 1 in the form of an air preheater. NOx-containing hot waste gas flows from a steam producer, not shown, to the regenerative heat exchanger 1 through a duct 2. The hot crude gas G (in the following merely referred to as gas) flows from the top into the regenerative heat exchanger 1 which has in its middle portion a catalyst which rotates continuously or in a stepwise manner. The catalyst is composed of catalytic storage masses 3 and a heat storage member 4 arranged below the storage masses 3. A segmented hood 5a, 5b, 6 each is provided on both sides or above and below the catalyst, i.e., above and below the storage masses 3 and the heat storage member 4. Because of the rotating movement of the catalyst, always different parts or cells of the storage masses 3 and the heat storage member 4 are subjected to the pollutant-containing hot gas G. As the gas G passes through the catalytically acting storage masses 3, a NOx reduction is effected through the NH3 by absorption. Simultaneously, the heating surfaces of the storage masses 3 and the heat storage member 4 are heated by the gas G which, in turn, is cooled and leaves the regenerative heat exchanger 1 at the lower end thereof in purified form through the duct 7.

At the lower end of the regenerative heat exchanger 1 which, in the illustrated example, is an air preheater, a line 8 is connected to the hood 6. Through the line 8, the clean cold combustion air L (in the following merely referred to as air) is supplied in a counterflow to the gas G through the hood 6 to the heating surfaces of the storage masses 3 and the heat storage member 4 which have been heated by the gas G. The air L cools the heating surfaces which absorb the heat and the air flows in the form of hot air through the upper hood 5a, 5b and through a duct 9 to the furnace.

Figure 2:
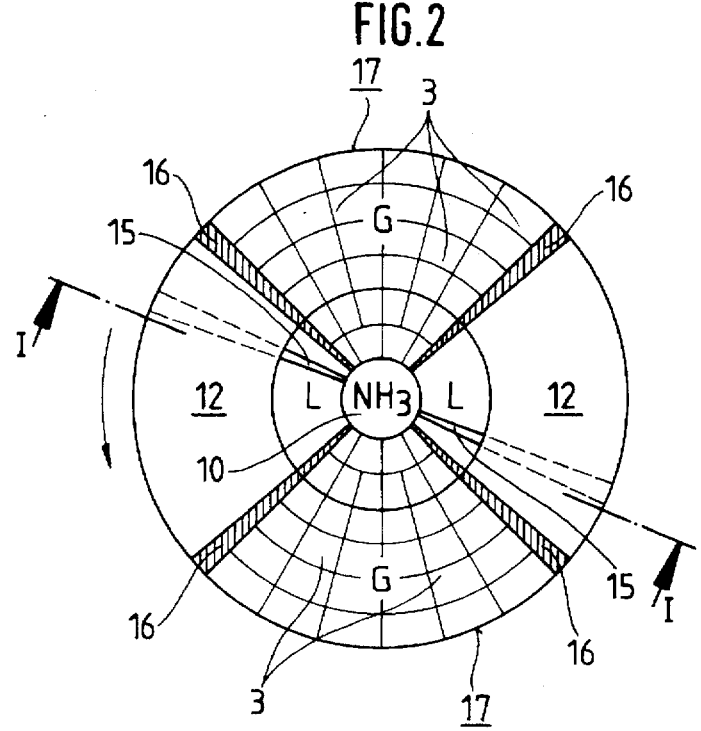
FIG. 2 is a schematic sectional view taken along sectional line II—II of FIG. 1.

For carrying out the NOx reduction, the reduction agent NH3 is conducted with preheated carrier air through a supply pipe 10 from the hot side of the regenerative heat exchanger 1 and through the upper hood 5a, 5b and is conducted through a nozzle arrangement 11 to the heating surfaces of the storage masses 3. The nozzle arrangement 11 shown in FIG. 1 is composed of arms 13 which branch off from the supply pipe 10 and extend in the air sectors 12 (compare FIG. 2) in both hood sides 5a, 5b to the outer circumference of the regenerative heat exchanger 1, wherein a row of individual nozzles 14 are provided in the arms 13. Alternatively, as seen in FIG. 2, the arms 13 may have a continuous slot-type nozzle 15 instead of individual nozzles 14.

The air sectors 12 are sealed relative to the gas sectors 17 by means of radial sealing ledges 16 and the individual nozzles 14 or the slot-type nozzles 15 inject the reduction agent with the carrier air in a free jet only to such an extent into the heating surface packs of the storage masses 3 as the heating surfaces of the catalyst extend into the depth thereof. Accordingly, the reduction agent does not penetrate into the heating surfaces of the heat storage member 4 which are located in the lower temperature range.

Figure 3:
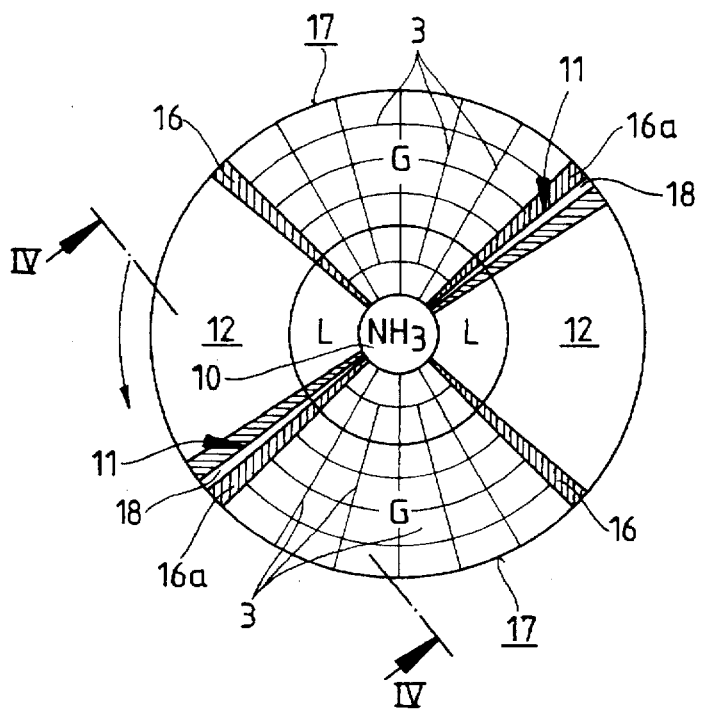
FIG. 3 is a schematic sectional view comparable to the view of FIG. 2 taken through a hood of a regenerative heat exchanger with a nozzle arrangement in which the flow ducts are arranged in the radial sealing ledges extending between the air sector and the gas sector.

In the embodiment of the reduction agent supply arrangement according to FIGS. 3 and 4, the nozzle arrangement 11 is constructed as a flow duct 18 arranged in the diametrically oppositely located radial sealing ledges 16a, so that a closed supply of the reduction agent is obtained. By supplying the reduction agent in separate flow ducts 18 of the sealing ledges 16a, a partial chamber rinsing can be carried out as it is illustrated in FIG. 4. In this case, the respective heat storage cell 4a is released on the cold side of the catalyst by the radial sealing ledge 16b corresponding to the heat storage member 4 only to such an extent that the reduction agent supplied through the flow duct 18 penetrates to the end of the catalyst zone while rinsing the flue gas filling (compare position I in FIG. 4). After a transition phase during which the heat storage cell 4a to which the NH3 is supplied is closed on the cold side (compare position II in FIG. 4), the sealing ledge 16b again releases a cross-sectional area of the heat storage cell 4a (compare position III in FIG. 4), so that air now entering this cell rinses out the residual flue gas and excess NH3 in a counterflow and conveys them through the duct 11 (compare FIG. 1) to the furnace which means that no NH3-containing waste gas reaches the environment.

The invention is not limited by the embodiments described above which are presented as examples only but can be modified in various ways within the scope of protection defined by the appended patent claims.

We claim:

1. A method in a regenerative heat exchanger for treating pollutant-containing waste gases, wherein the waste gases are conducted in a heat exchange with another medium, the regenerative heat exchanger including a catalyst with catalytic stationary or rotating storage masses, and a heat storage member connected to the catalyst, the heat storage member having heating surfaces, the catalyst having a hot side, the method comprising conducting a reduction agent from the hot side to the storage masses of the catalyst separately from the pollutant-containing waste gases and without contacting the heating surfaces of the heat storage member.

2. The method according to claim 1, comprising conducting the reduction agent to the storage masses through a free jet nozzle system.

3. The method according to claim 1, comprising supplying the reduction agent to the storage masses within a sealing system separating the heat-exchanging media during a change from air to flue gas or from pure gas to crude gas.

4. An apparatus in a regenerative heat exchanger for treating pollutant-containing waste gases, the regenerative heat exchanger including means for conducting the waste gases in a heat exchange with another medium, the regenerative heat exchanger further including a catalyst with catalytic stationary or rotating storage masses, and a heat storage member connected to the catalyst, the heat storage member having heating surfaces, the heat storage member having heating surfaces, the catalyst having a hot side and hoods above and below the storage masses, each hood having two sides, the apparatus comprising a nozzle arrangement in both sides of the hood above the storage masses, wherein the nozzle arrangement has at least one arm extending over the entire radius of the heat exchanger, such that reduction agent is conducted from the hot side to the storage masses of the catalyst separately from the pollutant-containing waste gases and without contacting the heating surfaces of the heat storage member.

5. The apparatus according to claim 4, wherein the at least one arm is provided with a slot-type nozzle.

6. The arrangement according to claim 4, wherein the at least one arm is provided with a plurality of individual nozzles arranged over the radius of the heat exchanger.

7. The apparatus according to claim 4, wherein the nozzle arrangement is angularly adjustable.

8. The apparatus according to claim 4, wherein the nozzle arrangement comprises a flow duct arranged in radially extending sealing ledges.

* * * * *